United States Patent [19]

Suzuki

[11] Patent Number: 5,034,237
[45] Date of Patent: Jul. 23, 1991

[54] METHOD OF MIXING OR KNEADING EDIBLE FLOUR

[76] Inventor: Toshiro Suzuki, 1160-12, Morooka-cho, Kohoku-ku, Yokohama-shi, Kanagawa 222, Japan

[21] Appl. No.: 379,732

[22] Filed: Jul. 14, 1989

Related U.S. Application Data

[63] Continuation of Ser. No. 95,532, filed as PCT JP86/00646 on Dec. 23, 1986, published as WO87/04052 on Jul. 16, 1987, abandoned.

[30] Foreign Application Priority Data

Dec. 28, 1985 [JP] Japan ................................ 60-1299071

[51] Int. Cl.$^5$ ........................... A21D 2/08; A21D 6/00
[52] U.S. Cl. .................................... 426/311; 426/519; 426/549; 426/558; 426/622
[58] Field of Search ..................... 426/62, 311, 19, 27, 426/331, 549, 555, 556, 558, 519, 524, 622

[56] References Cited

U.S. PATENT DOCUMENTS

| 3,449,131 | 6/1969 | Fritzberg. | |
|---|---|---|---|
| 3,894,155 | 7/1975 | Ono et al. | 426/27 X |
| 3,928,646 | 12/1975 | Hartley et al. | 426/556 X |
| 4,414,228 | 11/1983 | Nourigeon | 426/19 |

FOREIGN PATENT DOCUMENTS

| 2533418 | 3/1984 | France | 426/27 |
|---|---|---|---|
| 45380 | 12/1978 | Japan | 426/549 |
| 71640 | 4/1984 | Japan | 426/27 |
| 1076055 | 2/1984 | U.S.S.R. | 425/19 |

*Primary Examiner*—Arthur L. Corbin
*Attorney, Agent, or Firm*—James H. Tilberry

[57] ABSTRACT

A liquid-containing component containing a dissolved or dispersed solid ingredient is frozen to provide ice like granules which are then mixed or kneaded with flour to form a uniform blend of the flour and granules in a macroscopically homogeneous system. The system is further mixed or kneaded and the granules melted to cause melting of the flour and thereby produce a homogeneous mixture of the flour and liquid-containing component.

3 Claims, 1 Drawing Sheet

METHOD OF MIXING OR KNEADING EDIBLE FLOUR

This is a continuation of application Ser. No. 07/095,532, filed as PCT JP86/00646 on Dec. 23, 1986, published as WO87/04052 on Jul. 16, 1987, now abandoned.

TECHNICAL FIELD

This invention relates to a method of mixing or kneading edible flour, e.g., wheat flour, buckwheat flour, potato starch, corn flour and dry vegetable flour, with water and other components.

BACKGROUND ART

In the preparation of bread, noodles, cakes or other foods, the step of mixing or kneading flour with water constitutes a large proportion of the entire preparation process and often has a direct influence on the cost and quality of the final product. Generally, in the step of mixing and kneading the flour with added water, macroscopic mixing with laminar flow or shearing is done first by adding a comparatively small quantity of water. Thereafter, microscopic mixing by diffusive mixing is done to obtain a homogeneous system.

FIG. 1 is a graph schematically showing an example of a conventional mixing/kneading step. In the graph, the logarithm of the standard deviation $\sigma$ of samples indicating the degree of mixing is shown along the ordinate and the mixing time is shown along the abscissa. Generally, in a convection mixing area I in an initial stage of the mixing step, the convection mixing predominates. In a convection/shearing mixing area II in an intermediate stage, the mixing proceeds ordinarily by convection and shearing. In a diffusion/mixing area III in a final stage, the effects of diffusive mixing appear. As specifically shown in FIG. 1, the flour is rendered wet and viscous in the intermediate area II, and its resistances against the deformation is increased. Thus, macroscopic mixing by shearing consisting of a combination of rolling, folding, crushing and compressing is required. Consequently, considerable time, equipment, labor costs, and other expenditures are required for this step.

In the preparation of bread, noodles, cakes and other foods using the foregoing process, it is time-consuming also to homogeneously mix the flour with eggs, butter, milk, or a viscous component such as those obtained by straining steamed pumpkins, carrots, potatoes, spinach, ground fish meat and beef for the purpose of improving the taste of enhancing the nourishment. Further, it is difficult to homogeneously mix such additives as sugar, salt, vitamins, preservatives, and coloring agents. These mixing operations require considerable time, equipment, labor costs, and other expenditures.

In view of the foregoing, it is an object of the present invention to provide a method which permits reduction of time, equipment and expenditures such as power expenditure required for the step of mixing or kneading edible flour with water and/or other components.

SUMMARY OF THE INVENTION

According to the present invention, there is provided a method of mixing or kneading edible flour with water and other components which are frozen and then formed into granules for mixing. Such other components include additional ingredients which also may be formed into frozen granules for mixing with the flour as by initially dissolving or mixing them in water or milk.

In the method according to the present invention, water, eggs, butter, water or milk containing viscous components or sugar, salt, vitamins, preservatives and coloring agents are added in a granular ice-like form (hereinafter referred to as granular ice) to the flour, so that it is possible to mix the flour and water or other components in the solid phase or in a partly fused quasi-solid state. The flour is attached to the surfaces of the granular ice and, even when the granular ice is partly melted, the granular ice together with the attached flour maintain the behavior of dry particles and readily permit macroscopically homogeneous mixing with agitating means mainly based on convection mixing.

Subsequently, water, eggs and viscous food components which are gradually melted homogeneously wet the surrouding particles. Thus, it is possible to obtain a degree of mixing of a desired standard deviation without performing the shearing type mixing for a long time as compared to the case of the prior art mixing by directly adding water, eggs and viscous foods.

FIG. 2 schematically shows the step of mixing and kneading the flour and granular ice. Compared to the prior art mixing and kneading as shown in FIG. 1, the initial stage I in which the convection mixing predominates is long, and the intermediate stage II of convection and shearing mixing can be greatly reduced. It is thus possible to attain the desired mixing degree in a short mixing time.

As has been described in the foregoing, according to the present invention water can be readily homogeneously mixed in the form of granular ice with the wheat flour or other flours in the preparation of the bread, noodles, cakes and other foods. Further, eggs, butter or water-containing paste of pumpkins, carrots, potatoes, spinach, ground fish meat, etc. may be frozen and then rendered granular before mixing, whereby they can be very readily mixed. Further, sugar, salt and expanding agents as additives used to prepare bread, cakes and noodles, or such nourishment reinforcement agents as vitamin A, vitamin B and various amino acids, such as minerals, flavoring agents, iron citrate and lactic acid, such preservatives as calcium propionate and taste improvement agents can be readily homogeneously mixed by dissolving or dispersing them in water or milk, then freezing the solution or dispersion, then slicing the frozen substance with a slicer or the like into granules and then mixing the slices with the wheat flour or the like.

Water or milk, in which the additives are dissolved or dispersed, is suitably used in an amount necessary for the preparation of the product, e.g., bread. However, it is possible to use a lesser amount and to make up the difference with frozen water or milk granules.

As has been shown, with the method of mixing and kneading according to the present invention, it is possible to alleviate the burden of the step of mixing or kneading the edible flour with water and other components and obtain a mixture having high homogeneity.

DESCRIPTION OF EXAMPLES

Example 1

Figure 1:
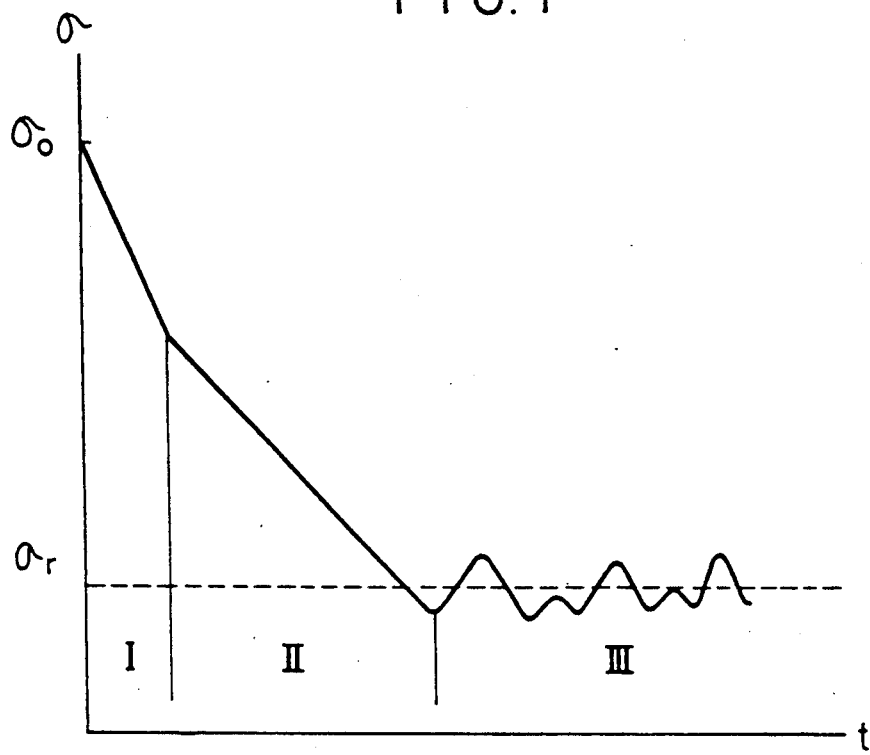
FIGS. 1 and 2 are graphs showing mixing characteristics when edible flour is mixed and kneaded with water or granular ice by the prior art method and the method according to the present invention, respectively.
Figure 2:
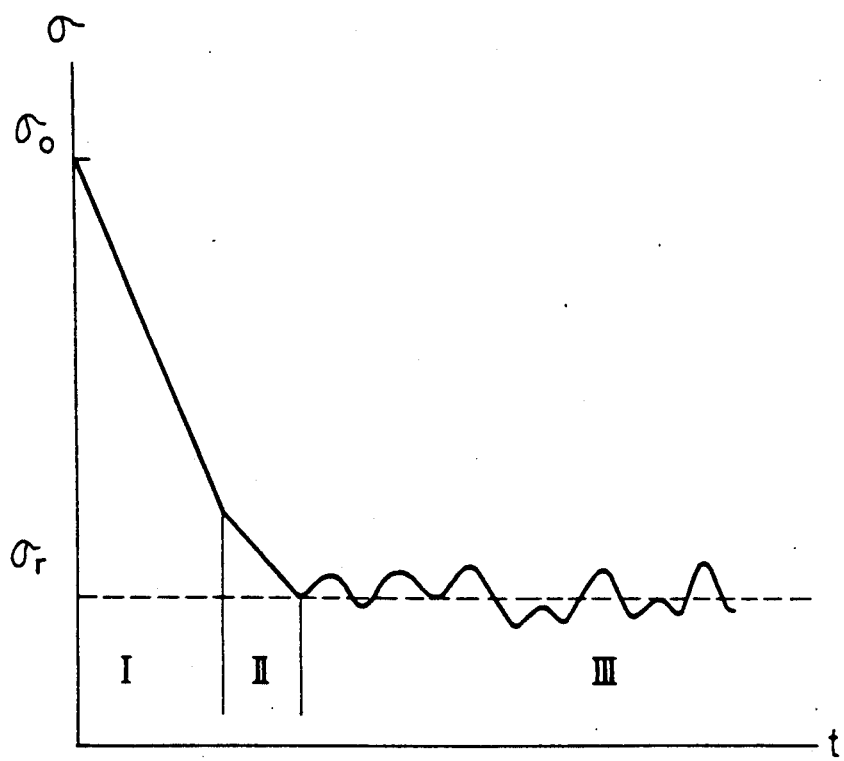

10 parts by weight of wheat flour and 2 parts by weight of granular ice (obtained using an ice slicer) were kneaded with a universal mixer for 15 seconds, and the resultant paste was press molded in a cylindrical vessel with a diameter of 50 mm with a force of about 100 kg. In this example, red ink was dissolved in the granular ice, and a section of the molding was observed to evaluate the degree of mixing according to the degree of dispersion of red ink. It was found that the homogeneity was very high.

Contrast Example 1

A molding was produced under the same conditions as in the preceding example except for using water in lieu of the granular ice. The section was then observed. The homogeneity was inferior compared to the value in the preceding example.

In the method of mixing and kneading, it is possible to dissolve a water-soluble substance, e.g., sugar and salt, in water in advance and freeze the resultant solution to obtain the granular ice. Further, it is possible to freeze an insoluble substance, e.g., eggs, milk and butter, in a state dispersed in water, crush the frozen substance into pieces, uniformly disperse these pieces in the granular ice and then mix with the granules together with the granular ice.

Example 2

Two small spoonfuls of dry yeast, 30 g of sugar and one small spoonful of salt were added to 400 g of wheat flour, and the mixture was sufficiently kneaded. Then, 40 g of frozen butter, 260 g of frozen milk and 30 g of frozen eggs (obtained by stirring and freezing all the eggs), these being rendered granular with an ice slicer, were added to the mixture flour, and the admixture was quickly mixed using a whisk. It was possible to knead the admixture for 5 minutes from the start of the kneading with the whisk. During this time, the admixture could be homogeneously kneaded. Then, the system was heated to about 30° C., then it was kneaded for about 15 minutes in the usual way, then it was caused to undergo fermentation in the usual way. Then, it was molded and baked to obtain bread.

Example 3

One large spoonful of baking powder and 30 g of sugar were added to 240 g of wheat flour, and the mixture was sufficiently mixed together. To the mixture thus obtained were added 40 g of frozen butter, 15 g of frozen milk and 60 g of frozen eggs (obtained by stirring and freezing all the eggs), these being rendered granular with an ice slicer, and the admixture was quickly kneaded using a whisk. The resultant system was wrapped and then held in a refrigerator for about 20 minutes. The system was then spread on a base with a slight amount of flour sprayed thereon and then stamped into the form of doughnuts, followed by frying with oil at a temperature of 170° C. to obtain doughnuts.

It was found that butter, milk and eggs were homogeneously mixed together.

Example 4

To test whether homogeneous mixing of the ground material of doughnuts was obtainable, a ground material of doughnuts was prepared in the manner as in Example 3 using butter colored with red No. 2 aluminum chelate pigment. The material obtained was held in the refrigerator, and the mass of material was cut using a table knife. The cutting surface was observed with the naked eyes. It was found that butter was substantially perfectly uniformly dispersed.

Contrast Example 2

For purposes of comparison, a ground material of doughnuts was prepared in the usual way by using butter colored with red No. 2 aluminum chelate pigment. More particularly, butter and sugar were mixed well, then a slight amount of milk was added. Then, one-sixteenth of two well-stirred eggs was added, and the admixture was then well mixed together using a whisk. Then, one-fourth of flour containing baking powder was added. Then, the remaining eggs, flour and milk were added little by little in a couple of times without kneading. The resultant system was then wrapped and held in the refrigerator for about 20 minutes. Then, as in Example 4, the mass was cut using a table knife, and the cutting surface was observed with the naked eye. A large number of red lines and also small red spots were observed, so that it was found that the admixture was not mixed sufficiently homogeneously.

The amounts of materials used were as in Example 4.

That is, 240 g of flour, one large spoonful of baking powder, 40 g of butter, 30 g of sugar, two large spoonfuls of milk and two eggs.

The present invention is convenient for mixing eggs to tempura coating, for which the formation of gluten, i.e., excessive stirring, is undesired.

It is further convenient to add granular ice in lieu of water where it is necessary to add water.

Example 5

Five large spoonfuls of baking powder and 90 g of sugar were dissolved in 700 cc of water, and the solution thus obtained was frozen in the refrigerator. The ice thus obtained was rendered granular using a slicer and added to 700 g of flour together with frozen sliced egg granules (obtained by stirring and freezing all three eggs) and 30 g of granular butter to facilitate the mixing. The admixture was then quickly mixed using a whisk, then wrapped and held for about 30 minutes. Then, the system was spread on a base with a slight amount of flour sprayed thereon. Then, it was stamped using a doughnut die. The stamped material was fried with oil at a temperature of 170° C. to obtain doughnuts.

The doughnut thus produced was cut, and the foam-like texture or structure at the cutting surface was observed with the naked eye. It was found that the foam-like texture or structure was very uniform and very fine.

The same results could be obtained when milk was used in lieu of water.

A similar observation was done with doughnuts produced from baking powder and flour in the prior art method. There are variations in the foam-like texture or structure, indicating that baking powder was not uniformly mixed.

Example 6

Pumpkins were cut to a suitable size, and the seeds and shell were removed. Then the pumpkin meat was steamed in a steamer and with high heat. Immediately after steaming, it was strained to obtain paste. The paste was then left to cool gradually to room temperature. Then, it was frozen in a freezer in small quantities.

200 g of this frozen pumpkin was cut using a slicer into granules. Meanwhile, 80 g of sugar and the yolks of four eggs were added to 180 g of milk, and the mixture was then kneaded and frozen. The ice was then crushed with the slicer into granules, which was mixed with 400 g of wheat flour.

The pumpkin, milk, sugar and egg yellow could be readily mixed with the wheat flour.

After the mixture was returned to the normal temperature, whipped egg white was added without crushing bubbles. The resultant material was then charged into a die coated with butter to be baked in an oven at a temperature around 170° C. for 30 minutes, thus obtaining cakes with pumpkin.

I claim:

1. A method of mixing or kneading edible flour with a liquid-containing component and at least one additional solid ingredient which may be dissolved or dispersed in said liquid-containing component comprising the steps of dissolving or dispersing said additional ingredient in said liquid-containing component, freezing said liquid-containing component including said dissolved or dispersed additional ingredient to provide a solid phase or quasi-solid phase of ice-like granules thereof, mixing or kneading said flour and ice-like granules with substantially dry particle behavior and primarily convection mixing to form a substantially uniform blend of the flour and granules in a macroscopically homogeneous system, and further mixing or kneading said macroscopically homogeneous system and melting said granules to gradually cause wetting of said flour to produce a homogeneous mixture of said flour and liquid-containing component with less shear mixing than is required by the mixing or kneading of said flour with a corresponding amount of said liquid-containing component which has not been frozen into ice-like granules.

2. A method according to claim 1, wherein said additional ingredient comprises a member selected from the group consisting of nourishment reinforcing agents, preservatives, coloring agents, flavoring agents, expanding agents and taste improving agents.

3. A method according to claim 1, wherein the step of forming said macroscopically homogeneous system includes initially mixing or kneading the granules and flour by predominantly convection mixing for a longer period of time than is required during the initial mixing or kneading of said flour with a corresponding amount of said liquid-containing component which has not been frozen whereby the desired degree of mixing is obtained in a relatively shorter mixing time.

* * * * *